UNITED STATES PATENT OFFICE.

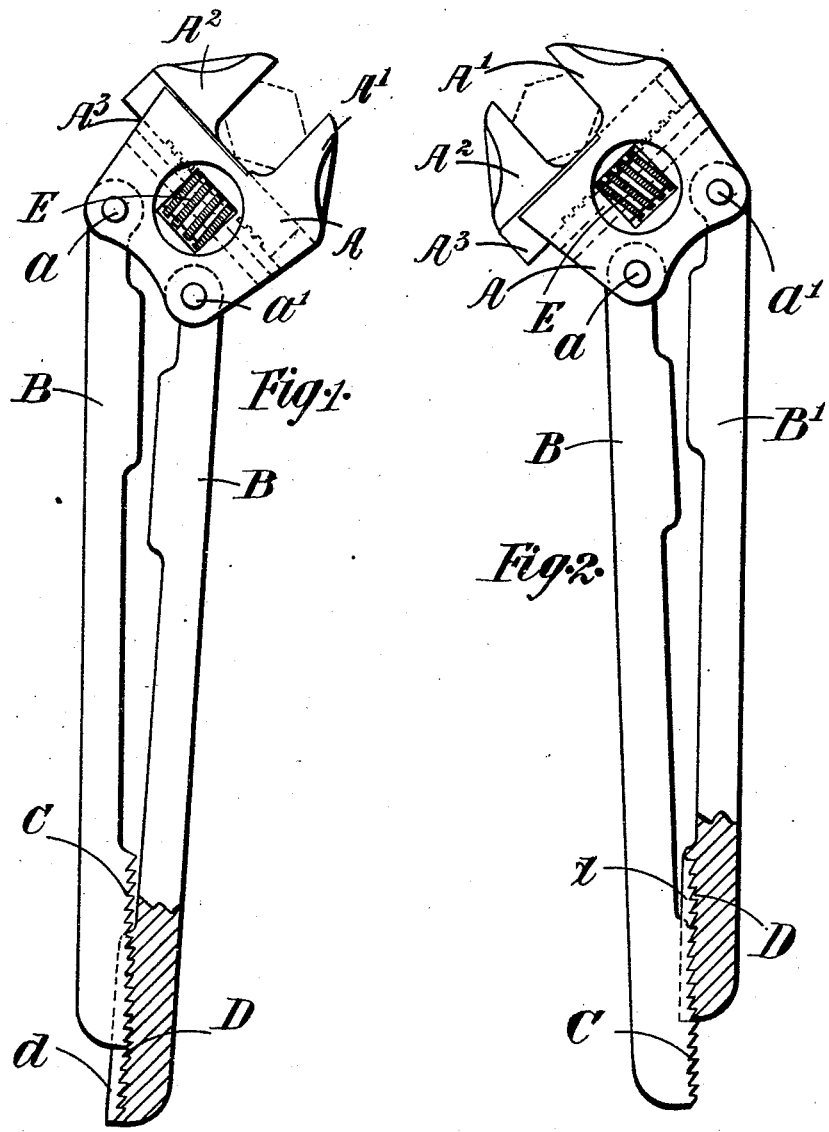

PERCY GEO. TACCHI, OF ACTON, ENGLAND.

SPANNER OR THE LIKE.

No. 912,507.  Specification of Letters Patent.  Patented Feb. 16, 1909.

Application filed October 12, 1906. Serial No. 338,670.

*To all whom it may concern:*

Be it known that I, PERCY GEORGE TACCHI, a subject of the King of Great Britain, residing at 29 Nemouri road, Acton, in the county of London, England, engineer, have invented certain new and useful Improvements in or Relating to Spanners or the Like, of which the following is a specification.

This invention relates to improvements in spanners or the like and has for its object to provide means whereby the jaws or head can be rotated round the work by small to and fro movements of the handle.

According to the present invention the jaws of the spanner and the handle are pivotally connected together and are adapted to be locked together or to be rigid with each other during the motion of the latter in one direction and the handle moves free or relatively to the jaws when moved in the opposite direction, thus providing a simple construction of the spanner and one capable of ready manipulation with one hand in places of difficult access.

The shank or handle is formed in two parts which are each provided with a series of ratchet teeth or equivalent one-way acting clutch members which when the two members of the shank are brought together as when being grasped by the user, are brought into engagement and when thus locked the two members form a handle permitting the necessary leverage to be exerted to turn the nut or the like By causing the teeth or clutch on one member to successively engage the corresponding device on the other member a considerable range of movement of the head is possible within a space permitting comparatively small radial movement of the handle Referring to the drawings, Figures 1 and 2 are views showing a spanner constructed in accordance with this invention, the parts being in the positions they assume respectively at the beginning and end of the operation.

A is the head and B the handle.

The head or gripping part A has jaws $A^1$ $A^2$ to engage with a nut or grip the work to be turned and has lugs between which the members B $B^1$ of the handle are pivoted as at $a$ $a^1$. The member $B^1$ is hollowed out or grooved along its inner side to receive the narrowed front edge of the member B the front edges $d$ of the part $B^1$ thus acting as guides to keep the parts B and $B^1$ in proper relative position.

On the front edge of the part B according to this embodiment of the invention and preferably at or near its free end are a number of teeth C with which similar teeth D on the part $B^1$ are adapted to engage. The arrangement is such that when in the operation of the tool, the two members B $B^1$ are held together or grasped in the user's hand the teeth are allowed, on account of their shape, to override when the two members are swung or moved in one direction, but on a movement in the other direction the two series of teeth engage locking the two members B $B^1$ together and to the head A thus preventing any relative movement between the parts.

The jaw $A^2$ is movable relatively to the jaw $A^1$ being provided with an extension $A^3$ adapted to slide in a groove in the head A and having teeth with which a worm rotatably mounted in the head, engages. By rotating the worm the jaws can be adjusted to grip the nut. The jaws may however be both rigid with the head Assuming that it is desired to tighten up a nut the parts A and B are set in the position shown in Fig. 1 the jaws $A^1$ $A^2$ embracing the nut. The handle B is grasped in the user's hand and oscillated to and fro through an appropriate angle, which, as the tool is specially intended for use in confined spaces, will be determined generally by the nature of the place in which it is used. It is only necessary for the proper operation of the tool that the handle is oscillated through an angle sufficient to advance the member B on the member $B^1$, the distance of one tooth. When the handle is moved to the left the members B $B^1$ turn on their pivots $a$ $a^1$ and the teeth C and D overriding, relative movement of the members B $B^1$ is permitted and no rotary motion is imparted to the head A. When however the handle is moved to the right the teeth C and D lock thereby preventing relative movement of the members B and $B^1$ which are thus locked together and their angular movement is transmitted to the head A, which in turn rotates the nut. The members B $B^1$ move relatively to each other and to the head by turning on their respective pivots at each movement to the left of the handle so that the teeth C advance on the teeth D the distance of one or more teeth at each stroke and on each movement to the right the members are locked together and to the head so that the parts A, B B¹ turn on a common axis, that is, around the axis of the work. When the parts by the movements above described have reached the positions shown in Fig. 2 and should it be desired to turn the nut farther the tool is withdrawn and re-set to the position shown in Fig. 1.

With this tool the head can be turned and rotate a nut from the position shown in Fig. 1 to that shown in Fig. 2 during which motion the handle instead of requiring to be moved through the same angle as the head as is the case with an ordinary spanner, only requires to be moved to and fro through an angle sufficient to advance the teeth C on the teeth D one tooth at a time and thereby impart a step by step rotary movement to the heads.

During the working stroke in which the members B and B' are locked, one member acts after the manner of a lever and the other as a strut so that although it is convenient to form both members of approximately the same length one may be shorter than the other, and the parts may be kept in contact by other means than by the grasp of the user's hand, for example by a spring.

Although the spanner has been described and illustrated with the jaws turned towards the extreme left for starting they may be set at any other desired angle, which may be most convenient for getting at the nut, and as the two sets of ratchet teeth lock at whatever angle the head may be relative to the handle, the head can be set at any required angle and locked so that the spanner can be used as an ordinary spanner.

The two members of the handle may be to some extent crossed to better insure engagement of the teeth or the like.

What I claim and desire to secure by Letters Patent of the United States is:—

1. In a spanner or similar tool the combination with a head or gripping part, two oscillatory handle parts of approximately equal length, and pivots connecting each of the handle parts at one of its ends to the head, of locking means at the free ends of the handle parts adapted to be held in locking engagement or released by the grip of the user while the spanner engages the work.

2. In a tool the combination with a head or gripping part which can be inclined at any angle to the handle and two similar handle parts, of co-acting teeth between the meeting ends of the handle parts and adapted to be engaged by the grip of the user when the shank is turned in one direction and to override when moved in the other direction, whereby the two members rotate around the same axis as the head when oscillated in one direction and turn on their pivots relatively to the head when oscillated in the other direction.

In testimony whereof I have signed my name to this specification in the presence of two subscribing witnesses.

PERCY GEO. TACCHI.

Witnesses:
 FREDK. L. RAND,
 H. D. JAMESON